(12) United States Patent
Park

(10) Patent No.: US 10,042,110 B2
(45) Date of Patent: Aug. 7, 2018

(54) LIQUID CRYSTAL DISPLAY AND MANUFACTURING METHOD THEREOF

(71) Applicant: Samsung Display Co., Ltd., Yongin (KR)

(72) Inventor: Se-Ki Park, Yongin (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 152 days.

(21) Appl. No.: 14/793,100

(22) Filed: Jul. 7, 2015

(65) Prior Publication Data

US 2016/0018692 A1 Jan. 21, 2016

(30) Foreign Application Priority Data

Jul. 21, 2014 (KR) .......................... 10-2014-0091933
Jun. 26, 2015 (KR) .......................... 10-2015-0091309

(51) Int. Cl.
*G02F 1/1339* (2006.01)
*F21V 8/00* (2006.01)
*G02F 1/1335* (2006.01)
*G02F 1/1333* (2006.01)

(52) U.S. Cl.
CPC ........... *G02B 6/0065* (2013.01); *G02B 6/005* (2013.01); *G02B 6/0043* (2013.01); *G02F 1/133615* (2013.01); *G02F 2001/133317* (2013.01); *G02F 2001/133325* (2013.01); *G02F 2202/28* (2013.01)

(58) Field of Classification Search
CPC ......... G02F 1/133308; G02F 1/133615; G02F 2001/133325; G02F 2202/28; G02F 2001/133317; G02B 6/0043; G02B 6/0065; G02B 6/005

USPC ........................................................ 349/153
See application file for complete search history.

(56) References Cited

U.S. PATENT DOCUMENTS

| 2006/0152647 | A1 | 7/2006 | Han et al. |
| 2008/0273147 | A1 | 11/2008 | Kim et al. |
| 2011/0176089 | A1 | 7/2011 | Ishikawa et al. |
| 2012/0075838 | A1 | 3/2012 | Lee et al. |
| 2012/0287348 | A1 | 11/2012 | Kuromizu |
| 2013/0223094 | A1* | 8/2013 | Yang .................... G02B 6/0085 362/606 |

(Continued)

FOREIGN PATENT DOCUMENTS

| EP | 2717090 | 4/2014 |
| KR | 1020110083493 | 7/2011 |

(Continued)

OTHER PUBLICATIONS

European Office Action—EP Application No. 15177778.6 dated Aug. 27, 2015.

(Continued)

*Primary Examiner* — Charles Chang
(74) *Attorney, Agent, or Firm* — Cantor Colburn LLP

(57) ABSTRACT

A liquid crystal display includes a display panel having a lower substrate, an upper substrate disposed opposite to the lower substrate, and a liquid crystal layer disposed between the lower and upper substrates, a light source which emits light, a glass light guide plate which diffuses the light from the light source to the display panel, and a first bonding member which bonds the lower substrate to the glass light guide plate.

16 Claims, 11 Drawing Sheets

(56) References Cited

U.S. PATENT DOCUMENTS

| | | | |
|---|---|---|---|
| 2014/0014960 A1* | 1/2014 | Yamazaki | G06F 3/0412 |
| | | | 257/59 |
| 2014/0092631 A1 | 4/2014 | Fujii et al. | |
| 2014/0204310 A1* | 7/2014 | Lee | G02F 1/133308 |
| | | | 349/62 |
| 2014/0347600 A1* | 11/2014 | Yun | G02B 6/0055 |
| | | | 349/62 |
| 2015/0212261 A1* | 7/2015 | Masuda | G02F 1/133308 |
| | | | 348/794 |

FOREIGN PATENT DOCUMENTS

| | | |
|---|---|---|
| KR | 1020120045445 | 5/2012 |
| KR | 1020120060962 | 6/2012 |

OTHER PUBLICATIONS

European Office Action for corresponding European Patent Application No. 15177778.6 dated Jul. 24, 2017.

\* cited by examiner

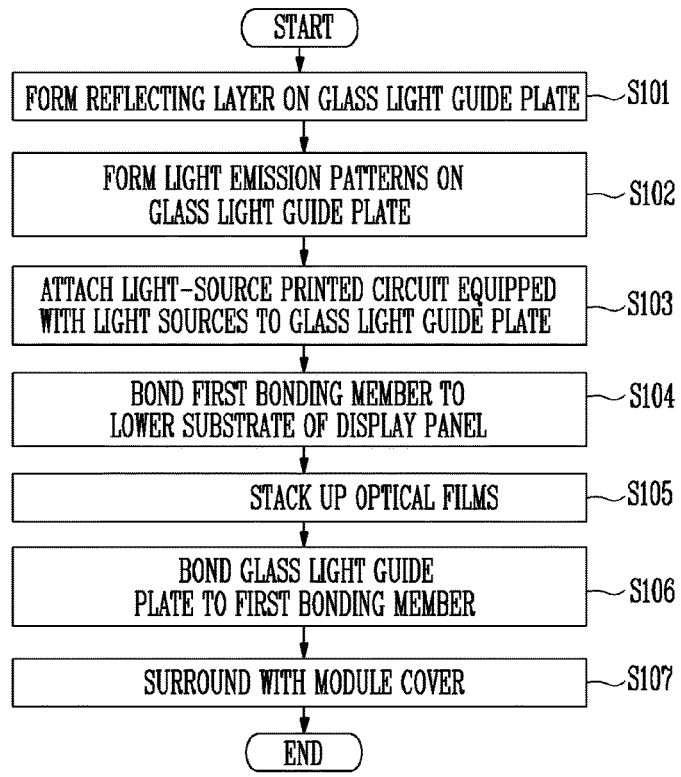
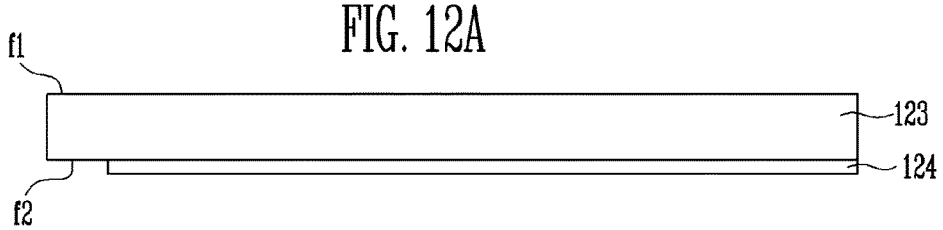
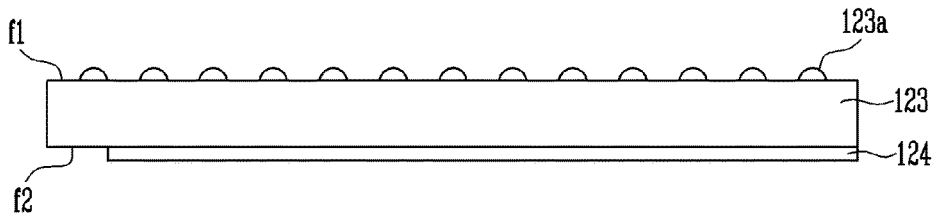

LIQUID CRYSTAL DISPLAY AND MANUFACTURING METHOD THEREOF

This application claims priority to Korean Patent Application No. 10-2014-0091933, filed on Jul. 21, 2014, and Korean Patent Application No. 10-2015-0091309, filed on Jun. 26, 2015, and all the benefits accruing therefrom under 35 U.S.C. § 119, the contents of which in their entirety are herein incorporated by reference.

BACKGROUND

1. Field

Exemplary embodiments of the invention relate to a liquid crystal display and a method of manufacturing the liquid crystal display.

2. Description of the Related Art

A liquid crystal display, which has a light weight, thin thickness and low power consumption, has been widely used as a display panel of various devices, e.g., a portable device such as a smartphone, a tablet PC or a notebook computer, office automation equipment, audio equipment, video equipment such as a monitor or a television, indoor and outdoor advertisement displays and others. The liquid crystal display is typically provided with a display panel having a liquid crystal layer, and a backlight unit configured to provide light to the display panel. The liquid crystal display controls an electric field that is applied to the liquid crystal layer, and then modulates light that is incident from the backlight unit, thus displaying an image.

Recently, a display device, which is further reduced in thickness and has an enhanced appearance, has been developed according to market demand. Particularly, in recent years, an organic light emitting display, which is typically thinner than the liquid crystal display, is coming onto the market. Therefore, it is desired to further reduce the thickness of the liquid crystal display.

SUMMARY

Exemplary embodiments of the invention provide a liquid crystal display having thin thickness, and a method of manufacturing the liquid crystal display.

According to an exemplary embodiment of the invention, there is provided a liquid crystal display including a display panel including a lower substrate, an upper substrate disposed opposite to the lower substrate, and a liquid crystal layer disposed between the lower substrate and the upper substrate; a light source which emits light; a glass light guide plate which diffuses the light from the light source to the display panel; and a first bonding member which bonds the lower substrate to the glass light guide plate.

In an exemplary embodiment, each of the lower substrate and the upper substrate may include glass.

In an exemplary embodiment, the first bonding member may include glass frit.

In an exemplary embodiment, the first bonding member may include a double-sided adhesive film or a double-sided cushion tape.

In an exemplary embodiment, the liquid crystal display may further include a plurality of optical films disposed between the display panel and the light guide plate, where a thickness of the bonding member may be equal to or larger than a thickness of the plurality of optical films.

In an exemplary embodiment, a plurality of light emission patterns may be defined on a first surface of the glass light guide plate facing the lower substrate.

In an exemplary embodiment, the liquid crystal display may further include a transparent layer disposed on the first surface of the glass light guide plate facing the lower substrate.

In an exemplary embodiment, the liquid crystal display may further include a reflecting layer disposed on a second surface of the glass light guide plate, which is opposite to the first surface of the glass light guide plate facing the lower substrate.

In an exemplary embodiment, the reflecting layer may include a first reflecting film including silver (Ag), aluminum (Al), palladium (Pd), copper (Cu), an alloy layer of the aluminum (Al), palladium (Pd) and copper (Cu) or a combination thereof.

In an exemplary embodiment, the reflecting layer may further include any one of second or third reflecting films disposed between the first reflecting film and the glass light guide plate, the second reflecting film may have a first refractive index, and the third reflecting film may have a refractive index different from the first refractive index.

In an exemplary embodiment the first bonding member may include a resin including at least one of silicone, epoxy and acrylic.

According to another exemplary embodiment of the invention, a method of manufacturing a liquid crystal display includes providing light emission patterns on a glass light guide plate; providing a reflecting layer on the glass light guide plate; attaching a printed circuit board, on which a light source is mounted, to the glass light guide plate; providing a plurality of optical films on a lower substrate of a display panel; and bonding the lower substrate to the glass light guide plate using a first bonding member.

In an exemplary embodiment, the lower substrate may include glass.

In an exemplary embodiment, each of the lower substrate and the glass light guide plate may include glass.

In an exemplary embodiment, the providing the light emission patterns on the glass light guide plate may include forming the light emission patterns on a first surface of the glass light guide plate facing the lower substrate.

In an exemplary embodiment, the forming the light emission patterns on the glass light guide plate may include: washing the glass light guide plate; treating the glass light guide plate with plasma; and dropping an ultraviolet ("UV") ink on the glass light guide plate using an inkjet device, and curing the UV ink.

In an exemplary embodiment, the providing the reflecting layer on the glass light guide plate may include providing the reflecting layer on a second surface of the glass light guide plate, which is opposite to the first surface of the glass light guide plate facing the lower substrate.

In an exemplary embodiment, the providing the reflecting layer on the glass light guide plate may include providing a first reflecting film on the glass light guide plate, where the first reflecting film may include silver (Ag), aluminum (Al), palladium (Pd), copper (Cu), an alloy layer of the aluminum (Al), the palladium (Pd) and the copper (Cu), or a combination thereof.

In an exemplary embodiment, The providing the reflecting layer on the glass light guide plate may further include providing a third reflecting film on the glass light guide plate, where the third reflecting film had a second refractive index; providing a second reflecting film on the third reflecting film, where the second reflecting film has a first refractive index that is different from the second refractive index; and depositing the silver (Ag), the aluminum (Al), the palladium (Pd), the copper (Cu), the alloy layer of the aluminum (Al), the palladium (Pd) and the copper (Cu), or a combination thereof on the second reflecting film to provide the first reflecting film.

In an exemplary embodiment, the bonding the lower substrate to the glass light guide plate using the bonding member may include: applying glass frit to the lower substrate; melting the glass frit; and joining the glass light guide plate to the melted glass frit.

In an exemplary embodiment, the bonding the lower substrate to the glass light guide plate using the bonding member may include: bonding a first adhesive surface of a double-sided adhesive film or a double-sided cushion tape to the lower substrate; and bonding the glass light guide plate to a second adhesive surface of the double-sided adhesive film or the double-sided cushion tape.

In an exemplary embodiment, the boding the lower substrate to the glass light guide plate using the boding member may include: applying a liquid adhesive including at least one of silicone, epoxy and acrylic on the lower substrate; joining the glass light guide plate to the liquid adhesive; and curing the liquid adhesive.

In an exemplary embodiment, a thickness of the bonding member may be equal to or larger than a thickness of the plurality of optical films.

BRIEF DESCRIPTION OF THE DRAWINGS

The above and other features of the invention will become more apparent by describing in further detail exemplary embodiments thereof with reference to the accompanying drawings, in which:

FIG. 11 is a flowchart showing an exemplary embodiment of a method of manufacturing a liquid crystal display according to the invention;

FIGS. 12A to 12G are cross-sectional views showing an exemplary embodiment of the method of manufacturing the liquid crystal display according to the invention;

DETAILED DESCRIPTION

Figure 1:
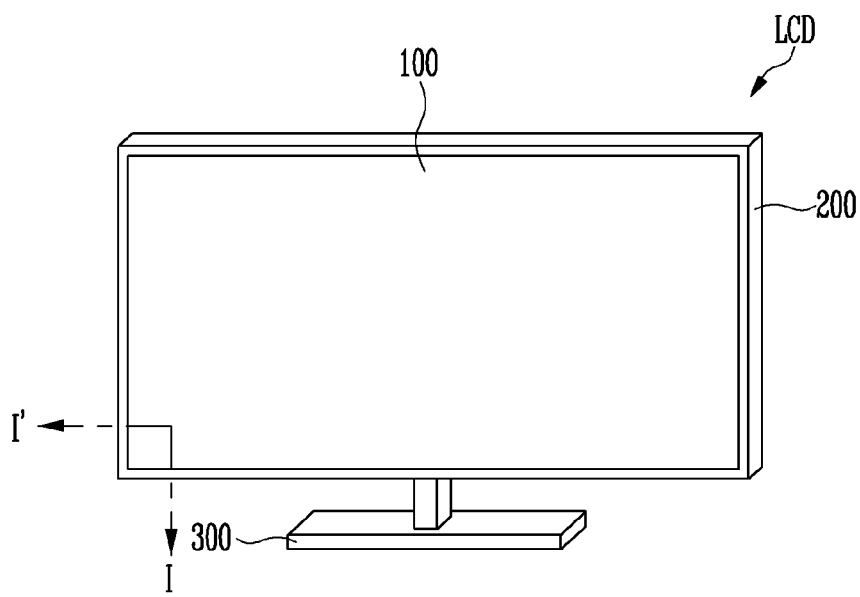
FIG. 1 is a perspective view showing an exemplary embodiment of a liquid crystal display according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

Hereinafter, exemplary embodiments of the invention will be described in detail with reference to the accompanying drawings.

FIG. 1 is a perspective view showing an exemplary embodiment of a liquid crystal display according the invention. Referring to FIG. 1, an exemplary embodiment of the liquid crystal display (referred to as "LCD" in FIG. 1) includes a liquid crystal module 100 including a display panel and a backlight unit, and an outer cover 200 which surrounds the liquid crystal module 100, as a case of a finished product, such as a notebook computer, a monitor, or a television, for example. The liquid crystal display may further include a support 300 that supports the liquid crystal module 100. In an exemplary embodiment, where the liquid crystal display is configured to be mounted on a wall or a window, or is implemented as a portable device, the support 300 may be omitted.

According to an exemplary embodiment of the invention, the display panel and the backlight unit are integrated with each other to define a single structure, such that the thickness of the liquid crystal module 100 may be substantially reduced. Hereinafter, an exemplary embodiment of the liquid crystal module 100, in which the display panel and the backlight unit are integrated with each other, and the liquid crystal display having such an embodiment of the liquid crystal module 100 will be described in detail.

Figure 2A:
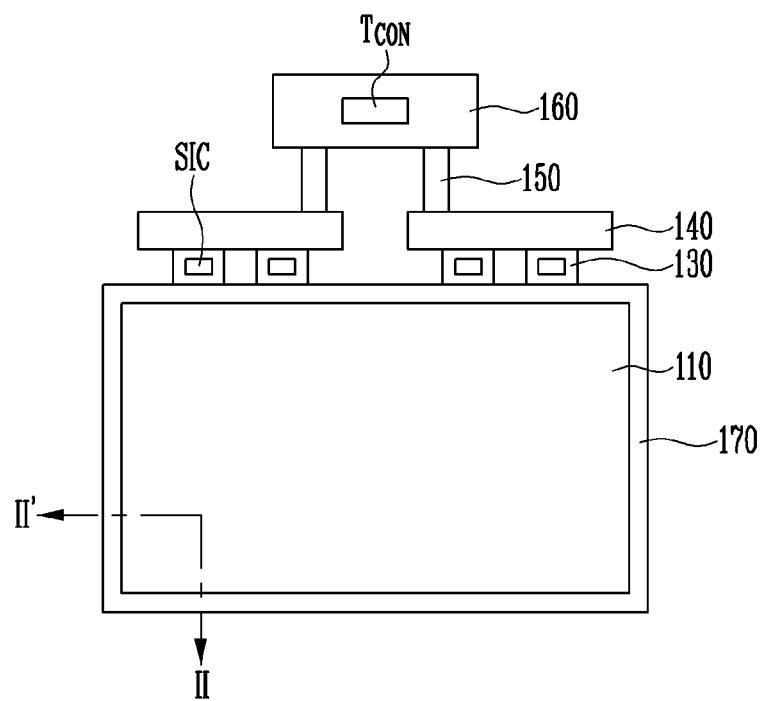
FIGS. 2A and 2B are front and rear plan views showing an exemplary embodiment of a liquid crystal module of the liquid crystal display, according to the invention.
Figure 2B:
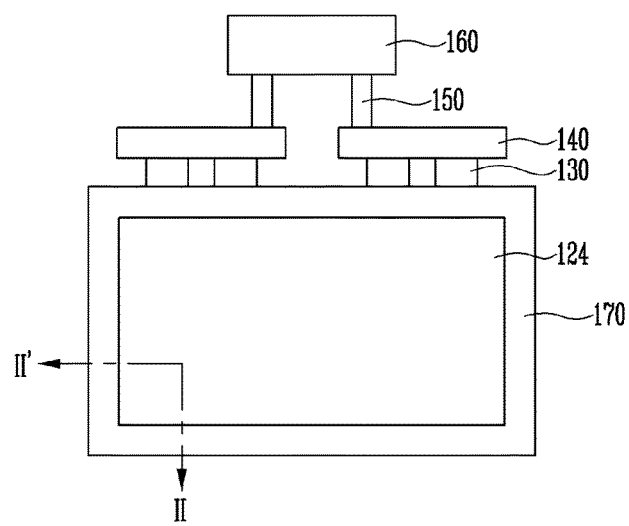
Figure 3:
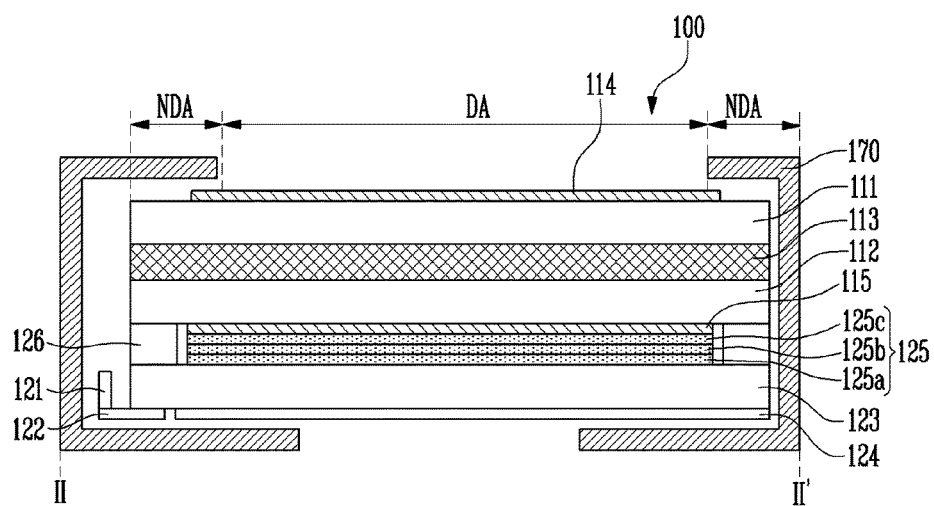
FIG. 3 is a cross-sectional view taken along line II-II' of FIGS. 2A and 2B showing an exemplary embodiment of a liquid crystal module.

FIGS. 2A and 2B respectively are front and rear plan views showing an exemplary embodiment of the liquid crystal module according to the invention, and FIG. 3 is a cross-sectional view taken along line II-II' of an exemplary embodiment of the liquid crystal module shown in FIGS. 2A and 2B. Referring to FIGS. 2A and 2B, an exemplary embodiment of the liquid crystal module 100 according to the invention may include a display panel 110, a backlight unit, flexible films 130, source printed circuit boards 140, flexible printed circuits 150, a control printed circuit board 160, and a module cover 170.

In an exemplary embodiment, as shown in FIG. 3, the display panel 110 includes an upper substrate 111, a lower substrate 112 disposed opposite to the upper substrate 111, and a liquid crystal layer 113 interposed between the upper substrate 111 and the lower substrate 112. Each of the upper substrate 111 and the lower substrate 112 may include or be made of glass. In an exemplary embodiment, the upper substrate 111 of the display panel 110 may include or be formed of a color filter substrate, and the lower substrate 112 may include or be formed of a thin film transistor substrate.

In an exemplary embodiment, data lines and gate lines are disposed on the lower substrate 112 of the display panel 110, and the data lines and the gate lines may intersect with each other. Pixels are arranged on the display panel 110 substantially in a matrix form, and connected to the data lines and the gate lines. In an exemplary embodiment, pixels may be disposed in positions where the data lines and the gate lines intersect with each other. In an exemplary embodiment, thin film transistors, pixel electrodes coupled to the thin film transistors, and storage capacitors are disposed on the lower substrate 112 of the display panel 110. In such an embodiment, the pixels may be defined by the thin film transistors, the pixel electrodes or the storage capacitors. Each of the pixels drives the liquid crystal of the liquid crystal layer 113 by a voltage difference between the pixel electrode, to which the data voltage is applied through the thin film transistor, and ae common electrode to which a common voltage is applied, thus controlling a light transmission amount and displaying an image.

In an exemplary embodiment, a color filter array including a black matrix and a color filter is disposed on the upper substrate 111 of the display panel 110. In an alternative exemplary embodiment, the black matrix and the color filter may be provided on the lower substrate 112 according to a color filter on array method. The common electrode is disposed on the upper substrate 111 according to a vertical electric field driving method, such as a Twisted Nematic ("TN") mode and a Vertical Alignment ("VA") mode. In an alternative exemplary embodiment, the common electrode may be disposed on the lower substrate 112 along with the pixel electrode according to a horizontal electric field driving method, such as an In Plane Switching ("IPS") mode and a Fringe Field Switching ("FFS") mode.

In an exemplary embodiment, an alignment layer is disposed on the display panel 110 to set the pre-tilt angle of the liquid crystal. In an exemplary embodiment, a spacer is disposed between the upper substrate 111 and the lower substrate 112 of the display panel 110 to maintain the gap of the liquid crystal layer 113.

In an exemplary embodiment, as shown in FIG. 3, the backlight unit includes a light source 121, a light-source printed circuit board 122, a glass light guide plate 123, a reflecting layer 124, a plurality of optical sheets 125, and a first bonding member 126. The backlight unit will be described later in greater detail with reference to FIG. 3.

The lower substrate 112 of the display panel 110 may include a display area DA in which pixels are disposed, and a non-display area NDA which is a remaining area except the display area DA, as shown in FIG. 3. A scan drive circuit (not shown) may be disposed on the non-display area NDA of the lower substrate 112. The scan drive circuit (not shown) receives a scan-timing control signal from a timing controller TCON. The scan drive circuit (not shown) provides scan signals to the gate lines in response to the scan-timing control signal.

In an exemplary embodiment, the scan drive circuit (not shown) may be provided, e.g., formed, on the non-display area NDA of the lower substrate 112 during a process of providing the pixels on the lower substrate 112. In an exemplary embodiment, the scan drive circuit (not shown) may be bonded to the non-display area NDA of the lower substrate 112 in a chip-on-glass ("COG") method. In an alternative exemplary embodiment, the scan drive circuit (not shown) may be mounted on a tape carrier package ("TCP"). In such an embodiment, the TCP may be joined to the non-display area NDA of the lower substrate 112 by a tape automated bonding ("TAB") process.

The flexible film 130 is attached to the display panel 110 and the source printed circuit board 140. The flexible film 130 may be a chip on film. A source drive integrated circuit ("IC") SIC may be disposed or mounted on the flexible film 130.

The source drive IC SIC receives the digital video data and the source-timing control signal from the timing controller TCON. The source drive IC SIC converts the digital video data into analog data voltages in response to the source timing control signal, and supplies the analog data voltages to the data lines of the display panel 110.

In an exemplary embodiment, where the display panel 110 is applied to a large-screen display device, such as a television, a plurality of flexible films 130 may be separately attached to the plurality of source printed circuit boards 140 as shown in FIGS. 2A and 2B. In an exemplary embodiment, as shown in FIGS. 2A and 2B, the source drive IC SIC may be mounted on the flexible film 130, but the invention is not limited thereto. In an alternative exemplary embodiment, the source drive IC SIC may be bonded to the lower substrate 112 of the display panel 110 by the COG process.

The flexible printed circuit 150 is attached to the source printed circuit board 140 and the control printed circuit board 160. The timing controller TCON may be mounted on the control printed circuit board 160.

The timing controller TCON receives the digital video data and the timing signal from an external host system (not shown). The timing controller TCON generates the scan-timing control signal and the source-timing control signal to control the operation timing of the scan drive circuit (not shown) and the data drive circuit based on the digital video data and the timing signal. The timing controller TCON outputs the scan-timing control signal to the scan drive circuit (not shown), and outputs the source-timing control signal to the source drive ICs.

Figure 4A:
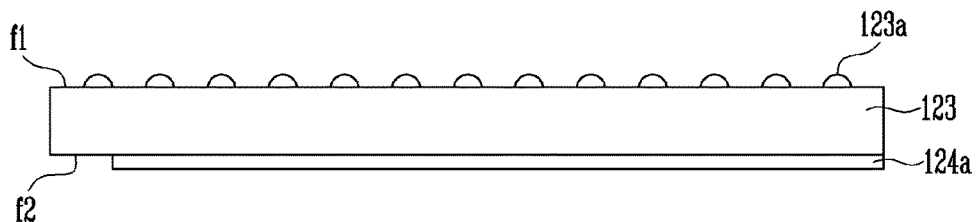
FIGS. 4A and 4B are cross-sectional views showing exemplary embodiments of a glass light guide plate and a reflecting layer of FIG. 3.
Figure 4B:
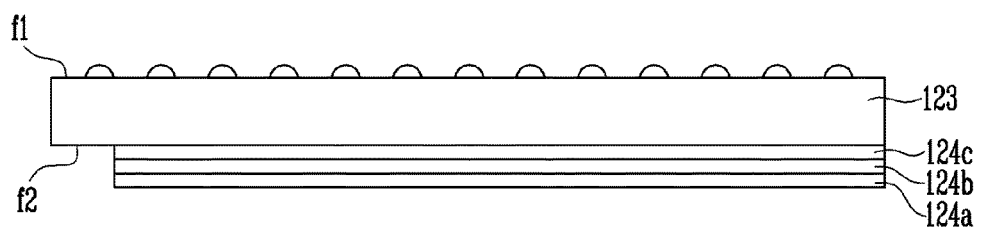

FIGS. 4A and 4B are cross-sectional views showing exemplary embodiments of a glass light guide plate and a reflecting layer of FIG. 3, and FIGS. 5A to 5C are enlarged views showing an exemplary embodiment of a light emission pattern. Referring back to FIG. 3, an exemplary embodiment of the liquid crystal module 100 includes the display panel 110, the backlight unit, and the module cover 170.

In such an embodiment, the display panel 110 is substantially the same as that described above with reference to FIGS. 2A and 2B. In such an embodiment, an upper polarizer 114 is attached to the upper substrate 111 of the display panel 110, and a lower polarizer 115 is attached to the lower substrate 112.

As shown in FIG. 3, the backlight unit includes the light source 121, the light-source printed circuit board 122, the glass light guide plate 123, the reflecting layer 124, the plurality of optical sheets 125, and the first bonding member 126.

In an exemplary embodiment, the light source 121 is implemented as a light emitting diode ("LED") package. The light source 121 is disposed, e.g., mounted, on the light-source printed circuit board 122 to be turned on or off in response to an electric signal from a light-source drive circuit (not shown). The light source 121 is located at a position corresponding to a side surface of the glass light guide plate 123, and emits light to the side surface of the glass light guide plate 123.

In an exemplary embodiment, the glass light guide plate 123 may include or be made of glass. The glass light guide plate 123 diffuses light from the light source 121 to the display panel 110. In such an embodiment, the point source of light emitted from the light source 121 is converted into a surface light source by the glass light guide plate 123 and then is radiated onto the display panel 110.

In an exemplary embodiment, a plurality of light emission patterns 123a may be defined or formed on a first surface f1 of the glass light guide plate 123 to enhance the light diffusion effect of the glass light guide plate 123, as shown in FIGS. 4A and 4B. The first surface f1 of the glass light guide plate 123 refers to a surface facing the lower substrate 112 of the display panel 110, and a second surface f2 refers to a surface opposite to the first surface f1.

Figure 5A:
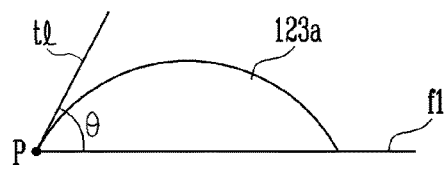
FIGS. 5A to 5C are enlarged views showing an exemplary embodiment of a light emission pattern.
Figure 5B:
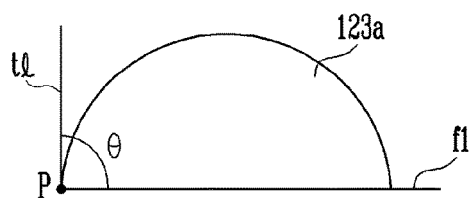
Figure 5C:
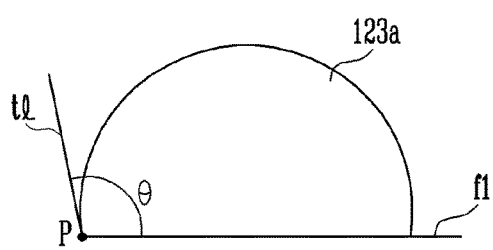

The light emission patterns 123a may be formed in the shape of a convex lens as shown in FIG. 5A, but the invention is not limited thereto. In an exemplary embodiment, the contact angle θ of each light emission pattern 123a ranges from about 0° to about 90°, as shown in FIG. 5A. The contact angle θ of the light emission pattern 123a refers to an angle between a tangent line t1 and the first surface f1 of the glass light guide plate 123. To be more specific, assuming that a location where the light emission pattern 123a meets the first surface f1 of the glass light guide plate 123 denotes a point P, the tangent line t1 refers to the line tangent to the light emission pattern 123a at the point P. In an exemplary embodiment, where the contact angle θ of the light emission pattern 123a is about 90° as shown in FIG. 5B or ranges from about 90° to about 180° as shown in FIG. 5C, optical properties for diffusing light are deteriorated or the light emission pattern 123a is damaged, such that reliability may be reduced.

Figure 6:
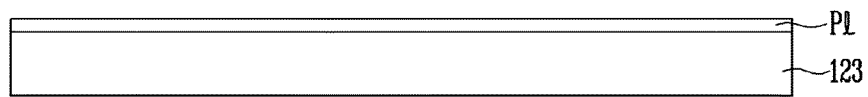
FIG. 6 is a side view showing an exemplary embodiment of a glass light guide plate and a transparent film of FIG. 3.

In an exemplary embodiment, as shown in FIG. 6, a transparent layer p1 may be disposed on the first surface f1 of the glass light guide plate 123. In such an embodiment, the first surface f1 of the glass light guide plate 123 may be coated with a transparent layer p1. In such an embodiment, where the glass light guide plate 123 is coated with the transparent layer p1, the transparent layer p1 may effectively prevent the glass light guide plate 123 from being broken to pieces even if cracks occur in the glass light guide plate 123. In such an embodiment, the transparent layer p1 may effectively prevent the glass light guide plate 123 from being broken. The transparent layer p1 may be a transparent plastic layer, such as polymethylmethacrylate ("PMMA") or polycarbonate ("PC"). In FIG. 6, the light emission patterns 123a are omitted for the convenience of illustration. In an exemplary embodiment, where the transparent layer p1 is disposed on the first surface f1 of the glass light guide plate 123, the light emission patterns 123a may be disposed on the transparent layer p1.

In an exemplary embodiment, the glass light guide plate 123 may be manufactured using thermal chamfering technique to minimize the breakage of the glass light guide plate 123. The thermal chamfering technique is the technique that cuts the glass light guide plate 123 to a desired size and then processes a cut surface using ceramics of high temperature. Since the glass light guide plate 123 is vulnerable to a side impact, in an exemplary embodiment where the cut surface of the glass light guide plate 123 is trimmed using the thermal chamfering technique, the breakage of the glass light guide plate 123 is effectively minimized.

The reflecting layer 124 is disposed on a second surface f2 of the glass light guide plate 123. The reflecting layer 124 reflects light, emitted downwards from the second surface f2 of the glass light guide plate 123, towards the glass light guide plate 123. The reflecting layer 124 may effectively prevent light from leaking to a lower portion of the glass light guide plate 123.

As shown in FIG. 4A, the reflecting layer 124 may include a first reflecting film 124a. In an exemplary embodiment, the first reflecting film 124a may include or be formed of silver (Ag), aluminum (Al), palladium (Pd), copper (Cu), an alloy layer of the aluminum (Al), the palladium (Pd) and the copper (Cu), or a combination thereof. In such an embodiment, where the glass light guide plate 123 includes or is formed of the glass, the first reflecting film 124a may be formed by a deposition process.

In an exemplary embodiment, the reflecting layer 124 may further include second and third reflecting films 124b and 124c between the glass light guide plate 123 and the first reflecting film 124a to further increase the reflectivity of the reflecting layer 124, as shown in FIG. 4B. The second reflecting film 124b is disposed between the first reflecting film 124a and the glass light guide plate 123, and may have a first refractive index. The third reflecting film 124c is disposed between the second reflecting film 124b and the glass light guide plate 123, and may have a second refractive index which is higher than the first refractive index. The larger a difference between the second refractive index and the first refractive index is, the higher the reflectivity of the reflecting layer 124 is. In one exemplary embodiment, for example, the second reflecting film 124b may include or be formed of $SiO_2$, and the third reflecting layer 124c may include or be formed of $TiO_2$.

In an exemplary embodiment, the second and third reflecting films 124b and 124c may be formed by a deposition process. In an exemplary embodiment, the second and third reflecting films 124b and 124c may be repeatedly formed in multiple layers. The more the repeated second and third reflecting films 124b and 124c are, the higher the reflectivity of the reflecting layer 124 is.

According to an exemplary embodiment of the invention, a reflecting film is deposited on the glass light guide plate 123 to form the reflecting layer 124. In an exemplary embodiment, the reflecting film is formed on the glass light guide plate 123 by a deposition process such that a thinner reflecting film is obtained as compared to a case where curing resin is coated onto the glass light guide plate 123 to form the reflecting film. As a result, in an exemplary embodiment of the invention, the thickness of the reflecting layer 124 may be reduced, and the thickness of the liquid crystal module 100 is thereby reduced. Therefore, according to exemplary embodiment of the invention, the thickness of the liquid crystal display may be effectively reduced. However, since a deposition process is typically performed at high temperature, it is impossible form the reflecting film by the deposition process when the light guide plate includes or is made of plastics.

The plurality of optical sheets 125 is configured to diffuse light from the glass light guide plate 123 and to render the light to be substantially perpendicularly incident on a light incidence plane of the display panel 10. The plurality of optical sheets 125 may include one or more prism sheets and one or more diffusing sheets. In an exemplary embodiment, as shown in FIG. 3, the optical sheets 125 may include two prism sheets 125a and 125b and one diffusing sheet 125c, but the invention is not limited thereto. The diffusing sheet 125c may be a dual bright enhanced film ("DBEF").

The first bonding member 126 bonds the lower substrate 112 of the display panel 110 to the glass light guide plate 123. To be more specific, the first bonding member 126 bonds the non-display area NDA of the lower substrate 112 to the glass light guide plate 123. The first bonding member 126 may include or be made of glass frit. Alternatively, the first bonding member 126 may be implemented by a double-sided adhesive film or a double-sided cushion tape. In one exemplary embodiment, for example, the double-sided adhesive film may be an optically clear adhesive ("OCA") film. The first boding member 126 may be a resin including at least one of silicone, epoxy and acrylic. The first bonding member 126 may be substantially equal to or greater than the plurality of optical films 125 in thickness.

The module cover 170 surrounds an upper edge of the display panel 110, side surfaces of the display panel 110 and the backlight unit, and a lower edge of the backlight unit to protect the liquid crystal module 100 from external shocks. The module cover 170 may include or be formed of plastics, for example, polyethylene phthalate ("PET"). In an alternative exemplary embodiment, the module cover 170 may be omitted.

As described above, according to an exemplary embodiment of the invention, the display panel 110 and the backlight unit of the liquid crystal module 100 are integrated with each other, by bonding the lower substrate 112 of the display panel 110 to the glass light guide plate 123 using the first bonding member 126. In such an embodiment of the invention, a top case and a lower cover of the backlight unit may be omitted, and a gap between the glass light guide plate 123 and the lower substrate 112 of the display panel 110 may be substantially reduced. Therefore, in such an embodiment, the thickness of the liquid crystal module 100 may be significantly reduced to allow the liquid crystal display to be substantially thin.

In an exemplary embodiment of the invention, the light guide plate includes or is formed of the glass to allow the display panel 110 and the backlight unit to be integrated with each other. Hereinafter, such an embodiment will be described in greater detail with reference to Table 1.

Table 1 shows the thermal expansion coefficient, strain point (Ts) and transition point (Td) of the glass, PET and polyethylene naphthalate ("PEN"). In Table 1, the glass is non-alkali display glass. The strain point (Ts) means a temperature at which the glass is melted and thereby the glass gets viscosity. The transition point (Tg) means a temperature at which a phase change occurs. As shown in Table 1, the thermal expansion coefficient of the glass is substantially lower than the thermal expansion coefficient of the PET and PEN. A substance having a lower thermal expansion coefficient may have higher resistance to heat.

TABLE 1

|  | Unit | Glass | PET | PEN |
|---|---|---|---|---|
| thermal expansion coefficient | ×10$^{-7}$/° C. | 38 | 330 | 200 |
| strain point (Ts) | ° C. | 669 | — | — |
| transition point (Tg) | ° C. | 700 or more | 80 | 150 |

If the light guide plate including or made of plastics having high thermal expansion coefficient, such as PET or PEN, is bonded to the upper and lower substrates 111 and 112 of the display panel 110 via the first bonding member 126, the thermal expansion degree of the upper and lower substrates 111 and 112 is different from the that of the plastic light guide plate when heat is applied thereto, because the upper and lower substrates 111 and 112 are different in thermal expansion coefficient from the plastic light guide plate. Thus, in the case of applying heat, the upper and lower substrates 111 and 112 and the plastic light guide plate may be detached from the first bonding member 126. Therefore, in the case of using the plastic light guide plate, the display panel 110 and the backlight unit of the liquid crystal module 100 may not be effectively integrated with each other.

In an exemplary embodiment of the invention, as described above, the upper and lower substrates 111 and 112 of the display panel 110 and the glass light guide plate 123 include or are formed of glass having substantially the same thermal expansion coefficient as each other. Thus, when the upper and lower substrates 111 and 112 of the display panel 110 and the glass light guide plate 123 are bonded to each other by the first bonding member 126, the upper and lower substrates 111 and 112 and the glass light guide plate 123 may be stably attached to the first bonding member 126, such that the display panel 110 and the backlight unit of the liquid crystal module 100 are effectively integrated with each other.

Figure 7:
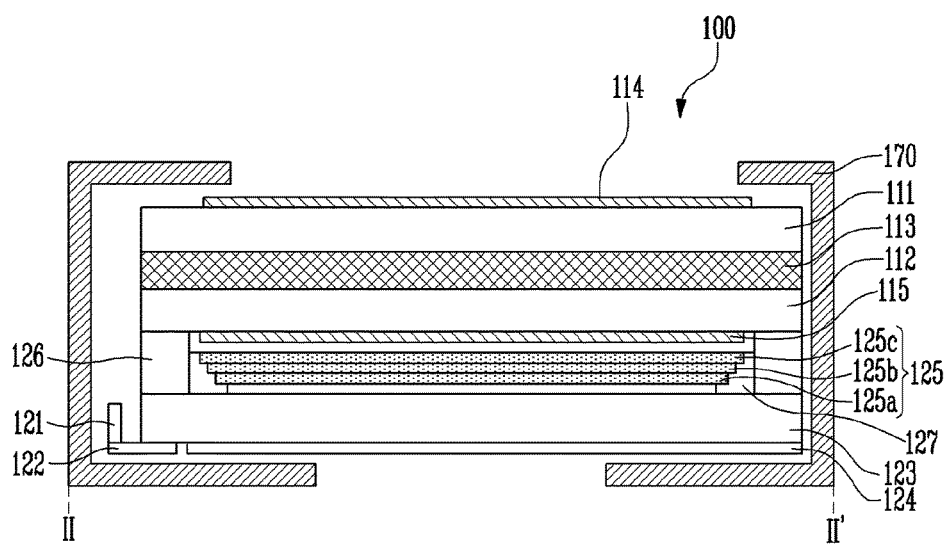
FIG. 7 is a cross-sectional view taken along line II-II' of FIGS. 2A and 2B showing an alternative exemplary embodiment of a liquid crystal module.

FIG. 7 is a cross-sectional view taken along line II-II' of FIGS. 2A and 2B, showing another exemplary embodiment of a liquid crystal module. Referring to FIG. 7, an exemplary embodiment of a liquid crystal module 100 includes a display panel 110, a backlight unit, and a module cover 170.

In such an embodiment, the display panel 110 may be substantially the same as that described above with reference to FIGS. 2A and 2B. In such an embodiment, an upper polarizer 114 is attached to an upper substrate 111 of the display panel 110, and a lower polarizer 115 is attached to a lower substrate 112.

In an exemplary embodiment, as shown in FIG. 7, the backlight unit includes a light source 121, a light-source printed circuit board 122, a glass light guide plate 123, a reflecting layer 124, a plurality of optical sheets 125, a first bonding member 126, and a second bonding member 127.

In such an embodiment, the light source 121, the light-source printed circuit board 122, the glass light guide plate 123, the reflecting layer 124, the plurality of optical sheets 125, the first bonding member 126, and the module cover 170 are substantially same as the light source 121, the light-source printed circuit board 122, the glass light guide plate 123, the reflecting layer 124, the plurality of optical sheets 125, the first bonding member 126 and the module cover 170 shown in FIG. 3, and any repetitive detailed description thereof will be omitted.

In an exemplary embodiment, as shown in FIG. 7, the second bonding member 127 joins the plurality of optical sheets 125 to the glass light guide plate 123. The second bonding member 127 may be implemented by a double-sided adhesive film or a double-sided cushion tape. In one exemplary embodiment, for example, the double-sided adhesive film may be an OCA film. In such an embodiment, where the second bonding member 127 is formed in a stepped shape as shown in FIG. 7, all the optical sheets 125 may be bonded to the second bonding member 127, and the plurality of optical sheets 125 may be substantially firmly secured.

Figure 8:
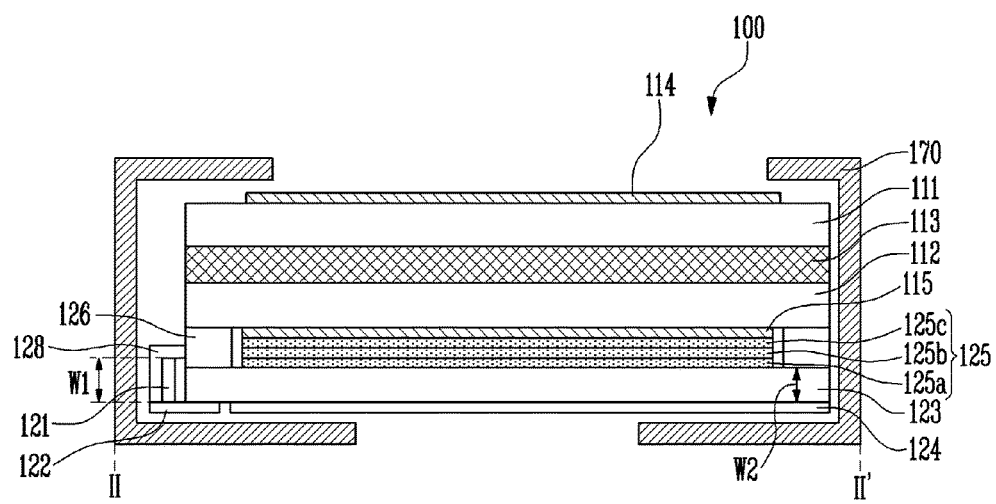
FIG. 8 is a cross-sectional view taken along line II-II' of FIGS. 2A and 2B showing another alternative exemplary embodiment of a liquid crystal module.

FIG. 8 is a cross-sectional view taken along line II-II' of FIGS. 2A and 2B, showing another alternative exemplary embodiment a liquid crystal module. Referring to FIG. 8, an exemplary embodiment of a liquid crystal module 100 includes a display panel 110, a backlight unit, and a module cover 170.

In such an embodiment, the display panel 110 may be substantially the same as that described above with reference to FIGS. 2A and 2B. In such an embodiment, an upper polarizer 114 is attached to an upper substrate 111 of the display panel 110, and a lower polarizer 115 is attached to a lower substrate 112.

In an exemplary embodiment, as shown in FIG. 8, the backlight unit includes a light source 121, a light-source printed circuit board 122, a glass light guide plate 123, a reflecting layer 124, a plurality of optical sheets 125, a first bonding member 126, and a light source housing 128.

In such an embodiment, the light source 121, the light-source printed circuit board 122, the glass light guide plate 123, the reflecting layer 124, the plurality of optical sheets 125, the first bonding member 126 and the module cover 170 are substantially same as the light source 121, the light-source printed circuit board 122, the glass light guide plate 123, the reflecting layer 124, the plurality of optical sheets 125, the first bonding member 126, and the module cover 170 shown in FIG. 3, and any repetitive detailed description thereof will be omitted herein.

In an exemplary embodiment, as shown in FIG. 8, a width W1 (e.g., a distance in a thickness direction of the display panel 110) of the light source 121 may be larger than a width W2 of the glass light guide plate 123. In such an embodiment, the light of the light source 121 may be directly progressed to the plurality of optical sheets 125 or the lower substrate 112 of the display panel 110 without passing through the glass light guide plate 123. In such an embodiment, light may not be uniformly radiated to an entire surface of the display panel 110.

In such an embodiment, the backlight unit may further include a light source housing 128 for reflecting light, which moves from the light source 121 to the plurality of optical sheets 125 or the lower substrate 112 of the display panel 110, onto the glass light guide plate 123, to improve uniformity of the light radiated to the entire surface of the display panel 110. The light source housing 128 may be configured to surround a side surface and an upper surface of the light source 121.

In such an embodiment of the invention, the light source housing 128 may effectively prevent light from leaking from the light source 121 to the plurality of optical sheets 125 or the lower substrate 112 of the display panel 110.

Figure 9:
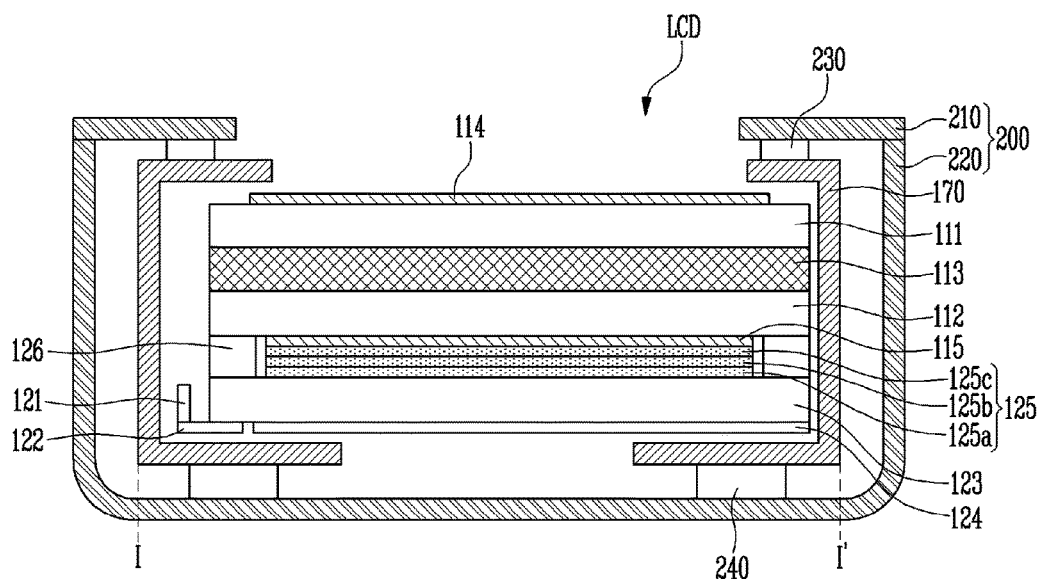
FIG. 9 is a cross-sectional view taken along line I-I' of FIG. 1 showing an exemplary embodiment of a liquid crystal display.
Figure 10A:
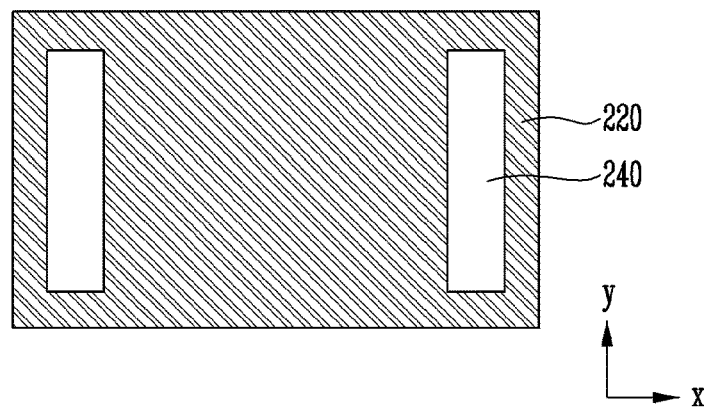
FIGS. 10A to 10C are plan views showing exemplary embodiments of a lower cover including a shock absorbing member.
Figure 10B:
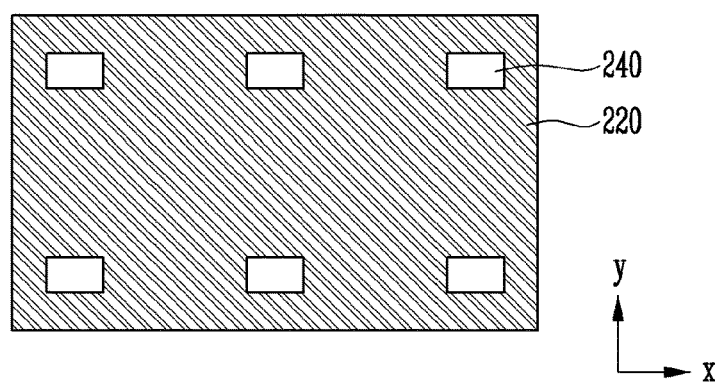
Figure 10C:
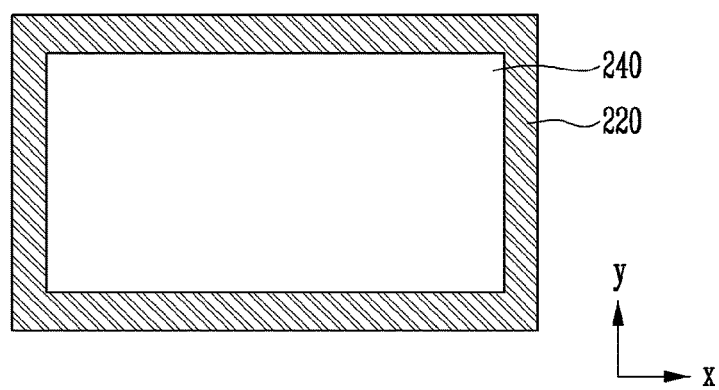

FIG. 9 is a cross-sectional view taken along line I-I' of FIG. 1, showing an exemplary embodiment of the liquid crystal display, and FIGS. 10A to 10C are plan views showing exemplary embodiments of a lower cover including a shock absorbing member. Referring to FIG. 9, an exemplary embodiment of the liquid crystal display (referred to as "LCD" in FIG. 9) includes the outer cover 200 that covers the liquid crystal module 100. In such an embodiment, the liquid crystal module 100 may be substantially the same as that described above with reference to FIGS. 1 to 8.

In an exemplary embodiment, the outer cover 200 includes an upper cover 210 and a lower cover 220. The upper cover 210 covers an upper edge of the liquid crystal module 100. The lower cover 220 covers the side surfaces and the lower portion of the liquid crystal module 100. In an exemplary embodiment, the upper cover 210 and the lower cover 220 may be attached or fastened to each other by a predetermined fastener. In an alternative exemplary embodiment, the upper cover 210 and the lower cover 220 may be integrated with each other, e.g., integrally formed as a single unitary and indivisible unit.

The upper cover 210 may be bonded to the module cover 170 of the liquid crystal module 100 by a third bonding member 230.

The lower cover 220 may include a cushion 240 to protect the liquid crystal module 100 from shocks. The cushion 240 may be implemented by the double-sided cushion tape for bonding the module cover 170 of the liquid crystal module 100 to the lower cover 220. In an exemplary embodiment, as shown in FIG. 10A, cushions 240 may be longitudinally attached to the left and right edges of the lower cover 220 in a first direction (e.g., y-axis direction). In an alternative exemplary embodiment, as shown in FIG. 10B, the cushions 240 may be attached to the upper and lower edges of the lower cover 220 in a second direction (e.g., x-axis direction). In another alternative exemplary embodiment, as shown in FIG. 10C, the cushions 240 may be integrally attached to an entire area except the edge of the lower cover 220. In such embodiments of the invention, positions to which the cushions 240 are attached are not limited to the positions shown in FIGS. 10A to 10C.

In an exemplary embodiment, the lower cover 220 may include a shock absorbing member, such as a spring, instead of the cushion 240.

FIG. 11 is a flowchart showing an exemplary embodiment of a method of manufacturing a liquid crystal display, according to the invention. FIGS. 12A to 12G are cross-sectional views showing an exemplary embodiment of the method of manufacturing the liquid crystal display, according to the invention. Hereinafter, an exemplary embodiment of the method of manufacturing the liquid crystal display according to the invention will be described in detail with reference to FIGS. 11, 12A to 12G.

In an exemplary embodiment, the reflecting layer 124 is provided, e.g., formed, on the glass light guide plate 123 (S101). As shown in FIG. 12A, the reflecting layer 124 is provided on a second surface f2 of the glass light guide plate 123. A first surface f1 of the glass light guide plate 123 refers to a surface facing the lower substrate 112 of the display panel 110, and the second surface f2 refers to a surface opposite to the first surface f1.

As shown in FIG. 4A, the reflecting layer 124 may include the first reflecting film 124a. The first reflecting film 124a may include or be formed of silver (Ag), aluminum (Al), palladium (Pd), copper (Cu), an alloy layer of the aluminum (Al), the palladium (Pd) and the copper (Cu), or a combination thereof.

In an exemplary embodiment, as shown in FIG. 4B, the reflecting layer 124 may further include second and third reflecting films 124b and 124c, which are provided between the glass light guide plate 123 and the first reflecting film 124a, to further increase the reflectivity of the reflecting layer 124. In such an embodiment, the third reflecting film 124c may be provided, e.g., deposited, on the second surface f2 of the glass light guide plate 123, the second reflecting film 124b may be provided on the third reflecting film 124c, and the first reflecting film 124a may be provided on the second reflecting film 124b. In such an embodiment, the second reflecting film 124b may have a first refractive index, and the third reflecting film 124c may have a second refractive index which is higher than the first refractive index. As a difference between the second refractive index and the first refractive index is increased, the reflectivity of the reflecting layer 124 is increased. The second reflecting film 124b may include or be formed of $SiO_2$, and the third reflecting film 124c may include or be formed of $TiO_2$.

In an exemplary embodiment, the second and third reflecting films 124b and 124c may be repeatedly provided, e.g., stacked, in multiple layers. In such an embodiment, the more the repeated second and third reflecting films 124b and 124c is, the higher the reflectivity of the reflecting layer 124 is. In such an embodiment, when the second and third reflecting films 124b and 124c are repeatedly stacked in multiple layers, the first reflecting film 124a may be omitted.

In an exemplary embodiment, the first to third reflecting layers 124a, 124b and 124c may be formed by a deposition process. The reflecting film formed on the glass light guide plate 123 by the deposition process may be thinner than the reflecting film provided on the glass light guide plate 123 by coating the glass light guide plate 123 with curable resin. Since the deposition process is typically performed at high temperature, the reflecting film may not be effectively provided by the deposition process if the light guide plate includes or is made of plastics. Therefore, in an exemplary embodiment of the invention, the glass light guide plate 123 including or formed of glass is used, thus allowing the thin reflecting layer 124 to be formed by the deposition process, thereby reducing the thickness of the liquid crystal module 100.

In an exemplary embodiment, the light emission patterns 123a are formed on the glass light guide plate 123. As shown in FIG. 12B, the light emission patterns 123a may be provided on the first surface f1 of the glass light guide plate 123 (S102). In one exemplary embodiment, for example, the light emission patterns 123a may be printed using an inkjet device, which will be described below in detail with reference to FIG. 13. In such an embodiment, the light emission patterns 123a may be formed by applying ultraviolet ("UV") curable resin to the first surface f1 of the glass light guide plate 123, imprinting patterns in relief or in intaglio, and then performing UV curing. In such an embodiment, the UV curable resin may include acrylic resin, a UV photo initiator or certain additives. In an exemplary embodiment, the light emission patterns 123a may be formed by melting the first surface f1 of the glass light guide plate 123 using laser beams and then curing the first surface f1. In an exemplary embodiment, the light emission patterns 123a may be randomly formed by blasting the first surface f1 of the glass light guide plate 123 with sand using a sand blaster.

In an exemplary embodiment, as shown in FIG. 6, the first surface f1 of the glass light guide plate 123 may be coated with the transparent layer p1. In such an embodiment, where the glass light guide plate 123 is coated with the transparent layer p1, the transparent layer p1 may effectively prevent the glass light guide plate 123 from be broken to pieces even if cracks occur in the glass light guide plate 123. In such an embodiment, the transparent layer p1 may effectively prevent the glass light guide plate 123 from being broken. The transparent layer p1 may be a transparent plastic layer, such as PMMA or PC.

In an exemplary embodiment, a thermal chamfering technique may be used to minimize the breakage of the glass light guide plate 123, when the glass light guide plate 123 is manufactured. The thermal chamfering technique may be a technique that cuts the glass light guide plate 123 to a predetermined or desired size and then processes a cut surface using ceramics of high temperature. Since the glass light guide plate 123 is typically vulnerable to a side impact, the breakage of the glass light guide plate 123 may be substantially reduced or minimized when the cut surface of the glass light guide plate 123 is trimmed using the thermal chamfering technique.

Figure 12C:
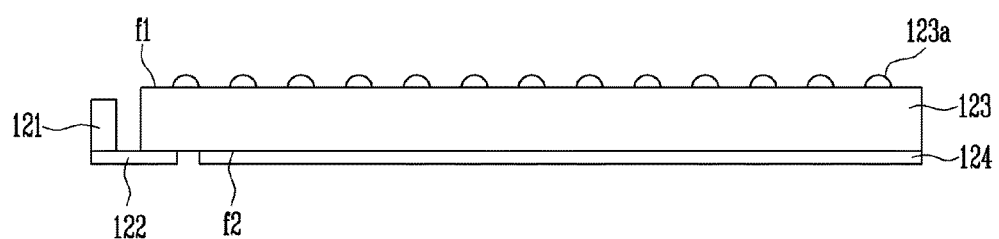

In an exemplary embodiment, the light source 121 is mounted on the light-source printed circuit board 122. Thereafter, as shown in FIG. 12C, the light-source printed circuit board 122, on which the light source 121 is mounted, is attached to the second surface f2 of the glass light guide plate 123 (S103). In such an embodiment, the light source 121 may be located at positions corresponding to a side surface of the glass light guide plate 123, such that light may be emitted onto the side surface of the glass light guide plate 123.

Figure 12D:
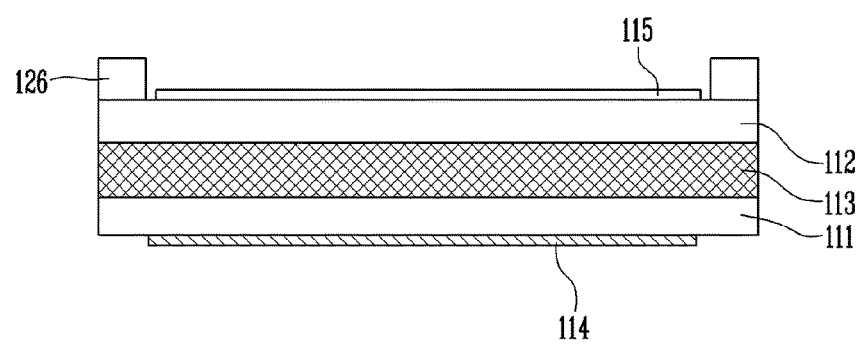

In an exemplary embodiment, as shown in FIG. 12D, the first bonding member 126 is bonded to the lower substrate 112 of the display panel 110 (S104). In one exemplary embodiment, for example, the first bonding member 126 may be glass frit. In such an embodiment, the glass frit is applied to the non-display area NDA of the lower substrate 112. In one exemplary embodiment, for example, the first bonding member 126 may be a double-sided adhesive film or double-sided cushion tape. In such an embodiment, the first adhesive surface of the double-sided adhesive film or double-sided cushion tape is bonded to the non-display area NDA of the lower substrate 112. In one exemplary embodiment, for example, a liquid adhesive including at least one of silicone, epoxy and acrylic may be applied to the non-display area NDA of the lower substrate 112 to join the glass light guide plate 123 to the liquid adhesive and then the liquid adhesive may be cured.

Figure 12E:
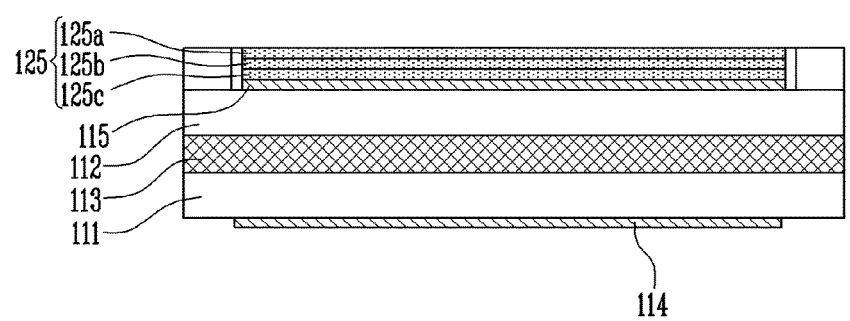

In an exemplary embodiment, as shown in FIG. 12E, a plurality of optical films 125 is disposed one on another, e.g., stacked up, on the lower substrate 112 of the display panel 110 (S105). In such an embodiment, the plurality of optical films 125 is stacked up on the lower polarizer 115 to overlap the display area DA of the lower substrate 112 as shown in FIG. 3.

Figure 12F:
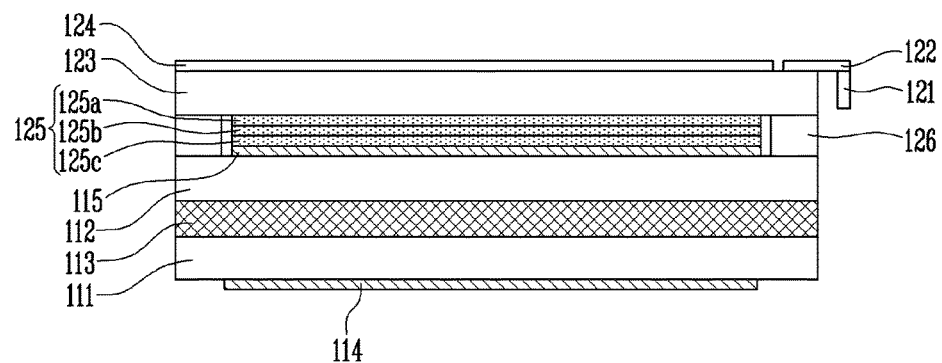

In an exemplary embodiment, as shown in FIG. 12F, the glass light guide plate 123 is bonded to the first bonding member 126 (S106). In an exemplary embodiment, where the first bonding member 126 is the glass frit, heat of about 300° C. to 600° C. is applied to the glass frit, thus melting the glass frit. Thereafter, the glass light guide plate 123 is joined to the melted glass frit. In an exemplary embodiment, where the first bonding member 126 is the double-sided adhesive film or double-sided cushion tape, the glass light guide plate 123 is bonded to a second adhesive surface of the double-sided adhesive film or double-sided cushion tape. The second adhesive surface of the first bonding member 126 refers to a surface opposite to the first adhesive surface.

Figure 12G:
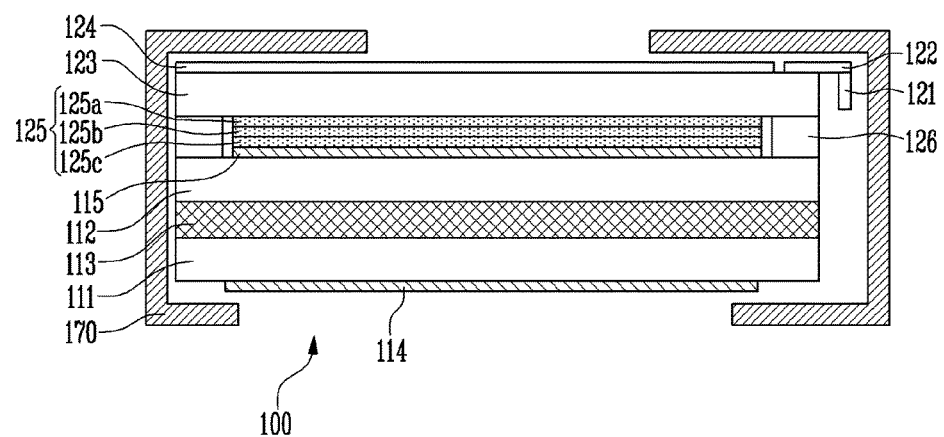

In an exemplary embodiment, as shown in FIG. 12G, the display panel 110 and the backlight unit are surrounded with the module cover 170 (S107). In one exemplary embodiment, for example, the module cover 170 surrounds the upper edge of the display panel 110, the side surfaces of the display panel 110 and the backlight unit, and the lower edge of the backlight unit. In such an embodiment, the module cover 170 surrounds the upper edge and side surface of the display panel 110, the side surface of the first bonding member 126, and the side surface and rear surface of the glass light guide plate 123. The module cover 170 may protect the liquid crystal module 100 from external shocks.

As described above, in an embodiment of the invention, the lower substrate 112 of the display panel 110 is bond to the glass light guide plate 123 using the first bonding member 126, such that the display panel 110 and the backlight unit of the liquid crystal modules 100 are allowed to be integrated with each other. Accordingly, in such an embodiment of the invention, the top case and the lower cover of the backlight unit may be omitted, and a gap between the glass light guide plate 123 and the lower substrate 112 of the display panel 110 is thereby substantially reduced. Therefore, in such an embodiment, the thickness of the liquid crystal module 100 is effectively reduced, and the liquid crystal display may have thin thickness.

Figure 13:
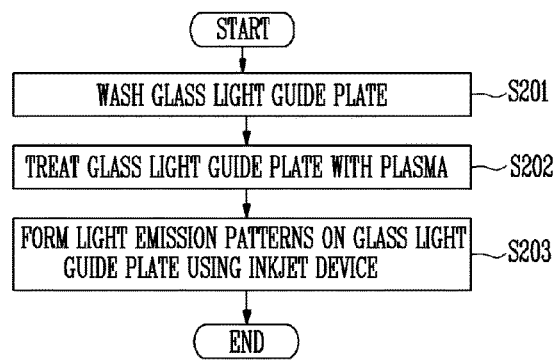
FIG. 13 is a flowchart showing an exemplary embodiment of a method of forming light emission patterns on the glass light guide plate.

FIG. 13 is a flowchart showing an exemplary embodiment of a method of forming the light emission patterns on the glass light guide plate. FIG. 13 shows an exemplary embodiment of the method of forming the light emission patterns 123a on the glass light guide plate 123 using the inkjet device.

In an exemplary embodiment, the glass light guide plate 123 may be washed (S201). The surface of the glass light guide plate 123 may be contaminated by impurities. In such an embodiment, the impurities from the surface of the glass light guide plate 123 may be removed and the surface tension of the glass light guide plate 123 may be maintained substantially constant by such a washing.

The process of washing the glass light guide plate 123 may include a liquid washing process, an ultrasonic washing process, a drying process, or a superfine-fiber fabric washing process, for example. Here, the liquid washing process is the process of washing the glass light guide plate 123 using a solution, such as isopropyl alcohol ("IPA"). The ultrasonic washing process is a process of washing the glass light guide plate 123 using ultrasonic waves. The drying process is the process of drying the glass light guide plate 123 using air. The superfine-fiber fabric washing process is the process of washing the glass light guide plate 123 using superfine-fiber fabric.

In an exemplary embodiment, the glass light guide plate 123 is treated with plasma (S202).

In an exemplary embodiment, the light emission patterns 123a are formed by dropping UV ink on the glass light guide plate 123, which is subjected to plasma treatment, using the inkjet device and then performing UV curing (S203). The UV ink may contain acrylic resin, an UV photo initiator, and certain additives.

As described above, in such an embodiment, where the light emission pattern 123a is formed on the glass light guide plate 123 after the glass light guide plate 123 has been washed and undergone plasma treatment, an ideal light emission pattern 123a may be formed to have the contact angle θ of the light emission pattern 123a in a range from about 0° to about 90°, as shown in FIG. 5A. As described above, if the contact angle θ of the light emission pattern 123a is about 90° as shown in FIG. 5B or in a range from about 90° to about 180° as shown in FIG. 5C, the optical properties for light diffusion may be deteriorated, or the light emission pattern 123a may be damaged, thus leading to a reduction in reliability.

Figure 14:
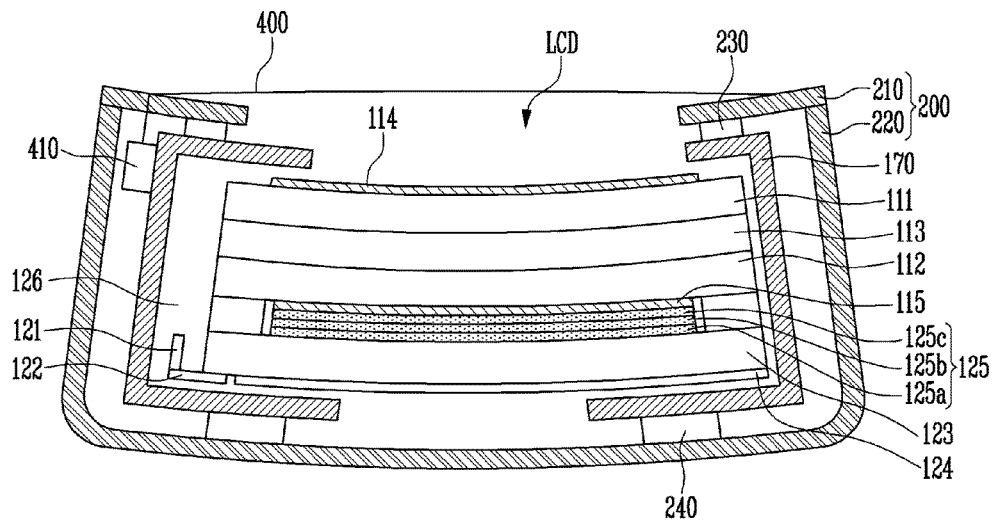
FIG. 14 is a view showing an exemplary embodiment of a liquid crystal display according to the invention, where the liquid crystal display is implemented as a curved display.

FIG. 14 is a view showing an exemplary embodiment the liquid crystal display according to the invention, where the liquid crystal display is implemented as a curved display. The liquid crystal display shown in FIG. 14 is substantially the same as the liquid crystal display shown in FIGS. 1 to 3 except for a reel 400 and a reel driver 410. The same or like elements shown in FIG. 14 have been labeled with the same reference characters as used above to describe the exemplary embodiments of the liquid crystal display shown in FIGS. 1 to 3, and any repetitive detailed description thereof will hereinafter be omitted or simplified.

Referring to FIG. 14, an exemplary embodiment of the liquid crystal display LCD according to the invention may further include the reel 400 and the reel driver 410 configured to control the tension of the reel 400.

The reel 400 may be secured to a side of the upper cover 210, and may be connected via another side of the upper cover 210 to the reel driver 410. The reel driver 410 may control or regulate the tension of the reel 400 in response to a predetermined control signal. In such an embodiment, when the reel driver 410 increases the tension of the reel 400 to the maximum, the liquid crystal display may be curved by the tension of the reel 400 to be implemented as the curved display as shown in FIG. 14. In such an embodiment, when the reel driver 410 reduces the tension of the reel 400, the liquid crystal display may be restored to the flat display as shown in FIGS. 1 and 3.

In exemplary embodiments of the liquid crystal display LCD according to the invention, all of the upper substrate 111, the lower substrate 112 and the glass light guide plate 123 includes or are formed of glass, such that the upper substrate 111, the lower substrate 112 and the glass light guide plate 123 have substantially the same bending or curving properties. In such embodiments, the restoring force of the glass is higher than that of the plastics. Thus, in exemplary embodiments of the invention, the liquid crystal display LCD is allowed to be effectively implemented as the flat display or the curved display by regulating the tension of the reel 400, in comparison with a conventional liquid crystal display where the light guide plate includes or is formed of plastics.

Figure 15:
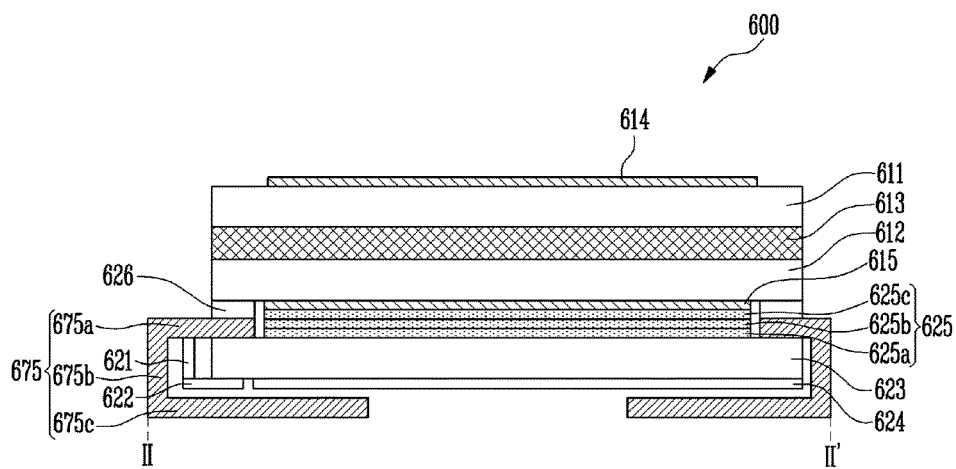
FIG. 15 is a cross-sectional view taken along line II-II' of FIGS. 2A and 2B, showing another exemplary embodiment of a liquid crystal module of a liquid crystal display.

FIG. 15 is a cross-sectional view taken along line II-II' of FIGS. 2A and 2B, showing another exemplary embodiment of a liquid crystal module of a liquid crystal display. Referring to FIG. 15, an exemplary embodiment of a liquid crystal module 600 may include a display panel, a backlight unit, and a mold frame 675.

In an exemplary embodiment, the display panel includes an upper substrate 611, a lower substrate 612, and a liquid crystal layer 613 interposed between the upper substrate 611 and the lower substrate 612. An upper polarizer 614 may be disposed on, e.g., attached to, the upper substrate 611, and a lower polarizer 615 may be disposed on, e.g., attached to, the lower substrate 612. The display panel shown in FIG. 15 is substantially the same as the display panel shown in FIG. 3, and any repetitive detailed description thereof will be omitted herein.

In an exemplary embodiment, the backlight unit includes a light source 621, a light-source printed circuit board 622, a glass light guide plate 623, a reflecting layer 624, and a plurality of optical sheets 625. The light source 621, the light-source printed circuit board 622, the glass light guide plate 623 and the plurality of optical sheets 625 shown in FIG. 15 are substantially the same as the light source 121, the light-source printed circuit board 122, the glass light guide plate 123 and the plurality of optical sheets 125 shown in FIG. 3, and any repetitive detailed description thereof will be omitted herein.

A plurality of reflecting films may be provided or deposited on the glass light guide plate 623 by a deposition process to form the reflecting layer 624, which is similar to forming the reflecting layer 124 shown in FIG. 3, but the forming method of the reflecting layer is not limited thereto.

The reflecting layer 624 may be manufactured using a reflecting sheet. In one exemplary embodiment, for example the reflecting layer 6224 may be formed by disposing the glass light guide plate 623 on a reflecting sheet disposed in the mold frame 675. Since the reflecting sheet and the glass light guide plate in the mold frame are supported by the mold frame itself, an additional boding member between the reflecting sheet and the glass light guide plate 623 may be omitted, but the invention is not limited thereto. In one exemplary embodiment, for example, to increase an adhesive strength, the reflecting sheet may be attached with the glass light guide plate 623 by a double-sided bonding film or a double-sided cushion tape on at least a portion of the edges of the reflecting sheet.

The mold frame 675 includes a side portion 675b surrounding side surfaces of the light source 621 and the glass light guide plate 623, a support 675a extending from a side of the side portion 675b to be in perpendicular with the side portion 675b and disposed, e.g., inserted, between the display panel and the glass light guide plate 623 and supporting the display panel, and a bottom portion 675c extending from the side portion 675b to face and be substantially parallel to the support 675a and supporting the bottom of the backlight unit.

As the support 675a and the bottom portion 675c extend perpendicularly from the side portion 675b, a sliding groove is formed between the support 675a and the bottom portion 675c so that part of the backlight unit may be inserted into the sliding groove.

The support 675a of the mold frame 675 is disposed between the lower substrate 612 of the display panel and the glass light guide plate 623 and attached to the lower substrate 612 of the display panel by a bonding member 626. The bonding member 626 may be a double-sided adhesive film or a double-sided cushion tape. In one exemplary embodiment, for example, the double-sided adhesive film may be an OCA film.

In an exemplary embodiment, as shown in FIG. 15, the display panel may be bonded to the mold frame 675 by the bonding member 626. In such an embodiment, the display panel may be stably attached to the mold frame 675 without any additional components (e.g. a top chassis) to attach the display panel to the backlight unit such that the thickness of the liquid crystal display may be effectively reduced.

The mold frame 675 may be provided at positions corresponding to four edges of the display panel or at positions corresponding at least part of the edges of the display panel. In one exemplary embodiment, for example, the mold frame 675 may be in a U-shape corresponding to the three sides of the display panel.

In an exemplary embodiment, The mold frame 675 may be provided in a single body, that is, integrally formed as a single unitary and indivisible unit, but not being limited thereto. In an alternative exemplary embodiment, the mold frame 657 may include a plurality of components, which may be assembled to define the mold frame 675. In one exemplary embodiment, for example, the mold frame 675 may be formed by organic materials including polymer resin, but the materials are not limited thereto. In an alternative exemplary embodiment, other materials that allow the mold frame 675 to have appropriate form and functions as described above may also be used to manufacture the mold frame 675.

Figure 16:
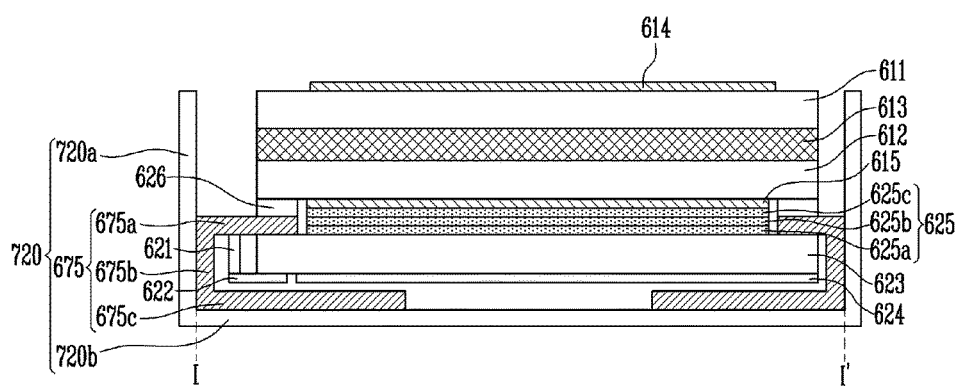
FIG. 16 is a cross-sectional view taken along line I-I' of FIG. 1 showing an alternative exemplary embodiment of a liquid crystal module, showing the liquid crystal module shown in FIG. 15 accommodated in a container.

FIG. 16 is a cross-sectional view taken along line I-I' of FIG. 1 showing an alternative exemplary embodiment of a liquid crystal module, showing the liquid crystal module shown in FIG. 15 accommodated in a container.

Referring to FIG. 16, the liquid crystal module may be accommodated in a container 720. The container 720 includes a bottom portion 720b substantially in the form of a rectangular plate, and a side portion 720a extending perpendicularly from the bottom portion 720b and defining an accommodating space with the bottom portion 720b. The container 720 accommodates the display panel, the mold frame 675 bonded or attached to the display panel and the backlight unit disposed in the mold frame 675 in the accommodating space.

Although it is not shown in FIG. 16, the liquid crystal module may further include an additional component (e.g. a cover chassis) disposed opposite to the bottom portion 720b of the container 720 and covering the edges of the display panel. In an exemplary embodiment, although it is not shown in FIG. 16, a cushion may further be provided on at least a portion of the bottom portion 720b of the container 720 to protect the liquid crystal module from a shock. The cushion may be disposed between the bottom portion 720b of the container 720 and the mold frame 675 and implemented as a double-sided cushion tape to bond the bottom portion 720b to the mold frame 675.

Herein, exemplary embodiments of the invention have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A liquid crystal display comprising:
    a display panel comprising:
        a lower substrate which comprises glass;
        an upper substrate disposed opposite to the lower substrate; and
        a liquid crystal layer disposed between the lower substrate and the upper substrate;
    a light source which emits light;
    a glass light guide plate which diffuses the light from the light source to the display panel; and
    a first bonding member which comprises glass frit and bonds the lower substrate to the glass light guide plate.

2. The liquid crystal display of claim 1, wherein the upper substrate comprises glass.

3. The liquid crystal display of claim 1, further comprising:
    a plurality of optical films disposed between the display panel and the light guide plate,
    wherein a thickness of the first bonding member is equal to or larger than a thickness of the plurality of optical films.

4. The liquid crystal display of claim 1, wherein a plurality of light emission patterns is defined on a first surface of the glass light guide plate facing the lower substrate.

5. The liquid crystal display of claim 1, further comprising:
    a transparent layer disposed on a first surface of the glass light guide plate facing the lower substrate.

6. The liquid crystal display of claim 1, further comprising:
    a reflecting layer disposed on a second surface of the glass light guide plate, which is opposite to a first surface of the glass light guide plate facing the lower substrate.

7. The liquid crystal display of claim 6, wherein the reflecting layer comprises a first reflecting film comprising silver (Ag), aluminum (Al), palladium (Pd), copper (Cu), an alloy layer of the aluminum (Al), palladium (Pd), copper (Cu) or a combination thereof.

8. The liquid crystal display of claim 7, wherein
    the reflecting layer further comprises any one of second or third reflecting films disposed between the first reflecting film and the glass light guide plate,
    the second reflecting film has a first refractive index, and
    the third reflecting film has a refractive index different from the first refractive index.

9. A method of manufacturing a liquid crystal display comprising:
    providing light emission patterns on a glass light guide plate;
    providing a reflecting layer on the glass light guide plate;
    attaching a printed circuit board, on which a light source is mounted, to the glass light guide plate;
    providing a plurality of optical films on a lower substrate of a display panel, wherein the lower substrate comprises glass; and
    bonding the lower substrate to the glass light guide plate using a bonding member which comprises glass frit.

10. The method of claim 9, wherein the providing the light emission patterns on the glass light guide plate comprises forming the light emission patterns on a first surface of the glass light guide plate facing the lower substrate.

11. The method of claim 9, wherein the forming the light emission patterns on the glass light guide plate comprises:
    washing the glass light guide plate;
    treating the glass light guide plate with plasma; and
    dropping an ultraviolet ink on the glass light guide plate using an inkjet device, and curing the ultraviolet ink.

12. The method of claim 9, wherein the providing the reflecting layer on the glass light guide plate comprises providing the reflecting layer on a second surface of the glass light guide plate, which is opposite to the first surface of the glass light guide plate facing the lower substrate.

13. The method of claim 12, wherein the providing the reflecting layer on the glass light guide plate comprises providing a first reflecting film on the glass light guide plate, wherein the first reflecting film comprises silver (Ag), aluminum (Al), palladium (Pd), copper (Cu), an alloy layer of the aluminum (Al), the palladium (Pd) and the copper (Cu), or a combination thereof.

14. The method of claim 12, wherein the providing the reflecting layer on the glass light guide plate further comprises:
    providing a third reflecting film on the glass light guide plate, wherein the third reflecting film has a second refractive index;
    providing a second reflecting film on the third reflecting film, wherein the second reflecting film has a first refractive index different from the second refractive index; and
    depositing the silver (Ag), the aluminum (Al), the palladium (Pd), the copper (Cu), or the alloy layer of the aluminum (Al), the palladium (Pd) and the copper (Cu) on the second reflecting film, to provide the first reflecting film.

15. The method of claim 9, wherein the bonding the lower substrate to the glass light guide plate using the bonding member comprises:

applying the glass frit to the lower substrate;
melting the glass frit; and
joining the glass light guide plate to the melted glass frit.

16. The method of claim 9, wherein a thickness of the bonding member is equal to or larger than a thickness of the plurality of optical films.

* * * * *